United States Patent [19]

Schürmann et al.

[11] 4,416,790

[45] Nov. 22, 1983

[54] PASTE-LIKE DAMPING MEDIUM AND METHOD FOR ITS MANUFACTURE

[75] Inventors: Helmut Schürmann, Dachau; Erich Brand, Munich, both of Fed. Rep. of Germany

[73] Assignee: Schiedel GmbH & Co., Munich, Fed. Rep. of Germany

[21] Appl. No.: 354,248

[22] Filed: Mar. 3, 1982

[30] Foreign Application Priority Data

Mar. 3, 1981 [DE] Fed. Rep. of Germany ....... 3107996

[51] Int. Cl.$^3$ ..................... C04B 43/00; C10M 5/04
[52] U.S. Cl. ........................................ 252/62; 252/21; 252/22; 252/23; 252/28; 252/29; 252/30; 252/75; 252/77; 252/309; 181/294
[58] Field of Search ...................... 252/21, 22, 23, 28, 252/29, 30, 62, 75, 77, 309; 181/294

[56] References Cited

U.S. PATENT DOCUMENTS

| | | | |
|---|---|---|---|
| 2,473,510 | 6/1949 | Denison et al. | 252/45 |
| 2,629,691 | 2/1953 | Peterson | 252/28 |
| 2,676,148 | 4/1954 | Iler | 252/21 |
| 2,890,170 | 6/1959 | Ragborg | 252/21 |
| 2,990,553 | 7/1961 | Ulrich et al. | 252/62 |
| 3,733,403 | 5/1973 | Chen | 252/28 |
| 3,812,937 | 5/1974 | Abbott et al. | 252/28 |
| 4,251,381 | 2/1981 | Lochner | 252/62 |

*Primary Examiner*—John E. Kittle
*Assistant Examiner*—Robert A. Wax
*Attorney, Agent, or Firm*—Armstrong, Nikaido, Marmelstein & Kubovcik

[57] ABSTRACT

The present invention relates to a paste-like damping medium for damping mechanical and/or acoustical vibrations, based on silicone oil, polyglycol, mineral oil and/or a thermally-stable aliphatic or aromatic carboxylic acid ester, finely divided solid material, an agent for reducing the surface tension and an agent for increasing the intrinsic viscosity.

20 Claims, 2 Drawing Figures

PASTE-LIKE DAMPING MEDIUM AND METHOD FOR ITS MANUFACTURE

The invention relates to a paste-like damping medium suitable for damping mechanical and/or acoustic vibrations. The paste-like damping medium comprises at least a finely divided solid or a finely divided mixture of solids, as liquid phase a silicone oil, polyglycol, mineral oil and/or a saturated aliphatic or aromatic carboxylic acid ester, an agent to lower the surface tension, or a wetting agent, and finely-divided magnesium- and/or aluminium silicates and/or finely-divided silicon dioxide as intrinsic viscosity stabilizers, and if necessary small additions of an antioxidant. The invention relates in addition to a method for producing the paste-like damping media and the use of the paste-like damping media in the most varied hydraulically-operating damping devices, industrial shock absorbers and industrial vibration dampers.

BACKGROUND OF THE INVENTION

Damping media for damping mechanical vibrations are known. Hydraulic oils, for example, have been suggested as damping media. However, these oils have the disadvantage that the heat formed when the damping medium is subjected to permanent load cannot be dissipated quickly enough, so that the oils become overheated and either foam or decompose.

Use has also been made of silicone oils containing hardening additives. These damping media undergo hardening under sudden load. Because of their limited flow properties, these dilatant damping media can only be used, however, for a few special damping processes. Damping media which harden also have the disadvantage of not possessing any noise-insulating property.

The U.S. Pat. No. 3,812,937 describes a damping medium for hydraulically-operating car shock absorbers. It consists of a low-viscosity petroleum oil, contains up to 20% by weight of an organophilic aminomontmorillonite that is prepared by reacting montmorillonite with an aliphatic amino salt, and contains acetonitrile.

The known hydraulic oil is a thickened oil which is not, however, suitable for damping high-frequency vibrations or for permanent loads because it is not able to dissipate the heat resulting from shock and/or tensile loads quickly enough. The petroleum oil starts to decompose at temperatures as low as about 82° C., while the viscosity of the damping medium is already considerably reduced at temperatures below 82° C.

The DE-OS No. 2 647 697 describes a damping medium dispersion comprising a liquid phase of silicone oil, mineral oil, polyglycol or a thermally stable, saturated aliphatic or aromatic carboxyl acid ester and, in the form of additives, graphite, wetting agents and viscosity stabilizers. The known damping medium dispersion is a non-hardened paste of relatively temperature-stable viscosity, which has good flow properties. However, the damping medium dispersion is made from relatively expensive starting materials.

SUMMARY OF THE INVENTION

The invention was therefore based on the object of providing a damping medium which can be manufactured from relatively cheap basic materials without the extensive thermal stability of the viscosity of the damping medium and hence the latter's flow properties and storage stability being impaired.

The object is established by means of a damping medium of the sort described at the beginning, which is characterized in that it has added to it about 20 to 80% by weight of at least one finely divided graphite-free solid which, if necessary, can be partly replaced by graphite, 80% of which has a particle size of less than 20 μm, about 0.1–4% by weight of wetting agent, about 0.5–10% by weight of finely divided Mg- and/or aluminium silicate and/or $SiO_2$ as intrinsic viscosity stabilizers and about 0.1–5% by weight of antioxidant, the % weight being based in each case on the total weight of the damping medium.

DESCRIPTION OF THE PREFERRED EMBODIMENTS

Figure 1:
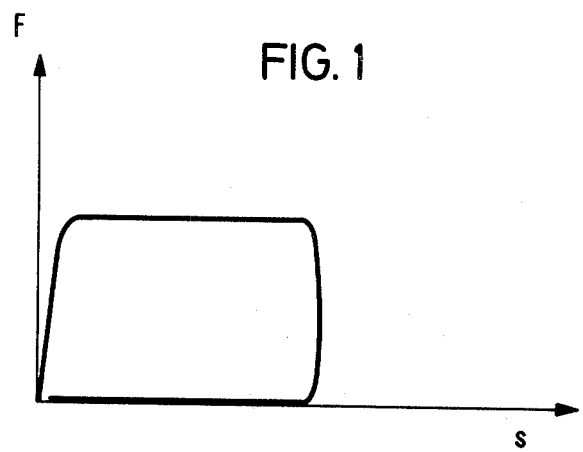
FIGS. 1 and 2 illustrate the dampening properties of the present invention.

It was surprising to find that the graphite used as solid material in known damping media can be replaced by various other solid materials, although these exhibit a different type of structure and particle arrangement or packing. The addition of this special solid material has the advantage that through selection of the respective solid material the damping medium can be adapted exactly for the required damping operation or damping element. The fact that the impairment of the flow properties and the viscosity, expected on account of substituting other solids for graphite, did not occur is apparently due to a synergistic interaction between the special solids and the other components of the damping medium when given quantitative proportions prevail. The damping medium according to the invention has a viscosity which is particularly stable with regard to temperature, and shows good paste stability when stored or used in dampers. There is no separating out or precipitating of any components of the mixture in the damping medium of the invention, even when the damping medium is stored for long periods or exposed to high pressure loads. Surprisingly, high storage stability prevails also in damping media which contain a mixture of light-coloured or graphite-free solids and graphite. There is apparently a stabilizing effect in action here, which may be caused by mutual adhering of the solid materials.

No environmental problems are involved in the processing of light-coloured solids, and the danger of pollution is much less than when graphite is used as the only solid.

If a silicone oil is used as basic material for the liquid phase, the viscosity of the silicone oil should preferably be at least 50 to 100 $mm^2/s$ at 50° C. Methyl and/or methyl phenyl silicone oils have proved particularly useful.

If a polyglycol is used as basic material for the liquid phase, the viscosity of the polyglycol should preferably be at least 20 $mm^2/s$ at 50° C., in particular 20 to 200 $mm^2/s$ at 50° C. It is preferable to use polyglycol ethers and/or esters which are either insoluble or only very slightly soluble. If polyglycol ethers or polyglycol ether mixtures of medium viscosity are used, the viscosity is about 70 to 90 $mm^2/s$, especially 80 $mm^2/s$ at 50° C. If highly viscous polyglycol ethers or polyalkylene glycol ethers are used, the viscosity is about 170 to 200 $mm^2/s$, in particular 180 $mm^2/s$ at 50° C. A preferably used polyalkylene glycol ether is for example the polyglycol ether LB 1800 (Union Carbide). The polyglycols used in the invention have a solidification point between about −50° C. and 0° C., in particular between −40° C. and −10° C., a relatively average molecular weight of about 700 to 20,000, in particular about 1,100 to 3,800.

Polyglycols with an average molecular weight of about 1,100 to 2,300 are especially preferred.

Use can also be made, however, of hydrophilic polyethylene, polypropylene and polybutylene glycols and mixtures thereof, as well as branched polyglycols and polyglycols derived from glycerine.

Suitable polyglycol ethers are for example the polyethylene glycol monoethylethers, propylethers, butylethers and pentylethers, the polypropylene glycol monomethylethers, ethylethers, propylethers, butylethers and pentylethers, and the polybutylene glycol monomethylethers, ethylethers, propylethers, butylethers, pentylethers and hexylethers and mixtures thereof.

The monoesters of the polyglycols can also be used, in particular the monoesters and diesters of the stearic, oleic and lauric acids of the aforementioned polyglycols.

Mineral oils with a viscosity of at least 25 mm$^2$/s at 50° C. can also be used as liquid phase. The flashpoint of the mineral oils should not be below 160° C. Particularly suitable mineral oils are for example those with a viscosity of 20 to 200 mm$^2$/s at 50° C. and a flashpoint of 190° to 220° C.

The liquid phase can also comprise a saturated aliphatic ester, for example the ester of a saturated, aliphatic monohydric or polyhydric $C_5$–$C_{12}$ alcohol with saturated aliphatic $C_5$–$C_{12}$ monocarboxylic acids. The di- and triesters of saturated aliphatic carboxylic acid esters are particularly preferred. Suitable aromatic diesters are the esters of aliphatic, saturated monohydric or polyhydric $C_5$–$C_{12}$ alcohols with phthalic acid, terephthalic acid and isophthalic acid. Suitable aromatic triesters are the esters of aliphatic, saturated monohydric or polyhydric $C_5$–$C_{12}$ alcohols with benzene tricarboxylic acids. The following esters are examples of esters which have proved particularly suitable: esters of pentaerythrite, of trimethylol propane, and of trimethyl propanol with straight-chain or branched $C_5$–$C_{12}$ carboxylic acids, the esters of adipic acid, such as adipic acid octyldecylester, and their derivatives, the esters of the glutaric and/or pimelic acids, the esters of the phthalic acids, such as diethylhexyl phthalate, dioctylphthalate, diisotridecyl phthalate, didecyl phthalate, and esters of the trimellitic acids, trimesine acids and/or hemillitic acids, for example tridecyl- and trioctyl esters of the trimellitic acids.

The liquid phase has added to it, in particular, a graphite-free solid. The solids make up 20 to 80% by weight, preferably 30 to 70% by weight, based on the total weight of the damping medium. If there is less than 20% by weight of solid material, the damping medium has too low a viscosity, so that it can hardly be used as an effective damping medium. If more than 80% by weight of solid material is used the resulting substance is so firm that the flow property is impaired. The preferred range for the solid additives is between about 30 and 60% by weight, based on the total weight of the damping medium.

Suitable solids are finely-divided ones which have a favourable effect on the intrinsic viscosity of the damping medium. These include aluminium oxide, aluminium hydroxide, aluminium carbonate, aluminium triphosphate, aluminium silicate, cryolite, barium sulfate, calcium carbonate, calcium hydroxide, calcium triphosphate, calcium fluoride, magnesium oxide, magnesium carbonate, magnesium aluminium silicate, magnesium stearate, lithium stearate, molybdenum sulfide, silicon dioxide, sillimanite, titanium dioxide, zinc sulfide, zinc pyrophosphate and/or polytetrafluoroethylene. A particularly suitable magnesium silicate is for example powdered talc, while a particularly suitable aluminium silicate is for example kaolin.

The particle size of the light-coloured solids is at a maximum 20 μm for 80% of the particles. It is preferable if 80% of the solid particles measure less than 10 μm, in particular less than 5 μm.

The advantageous use of light-coloured solids will now be explained in more detail with reference to the most important of these solids.

Powdered talc and kaolin exhibit good lubricity and good thermal stability, so that the damping medium of the invention will also exhibit good lubricity and good thermal stability if prepared using these components. Kaolin has very good thickening properties, which means that the total proportion of solid material can be reduced while at the same time the damping medium is capable of a high degree of energy conversion. Calcium carbonate as solid additive disperses very well, as a result of which the working properties of the damping medium are improved.

The use of aluminium oxide increases the thermal stability of the damping medium. By using zinc sulfide as solid additive the pressure resistance of the damping medium according to the invention can be increased and, in addition, the solid materials are caused to disperse better. This is especially important if a mixture of solids is used.

Barium sulfate is a very cheap and completely inert raw material, and is therefore particularly suitable for the production of rubber-compatible damping media. Molybdenum sulfide is used as additive especially if the lubricity and maybe the dispersing quality of the solid materials are to be improved. Even small quantities of molybdenum sulfide improve the lubricity of the damping medium effectively. Molybdenum sulfide is used especially in conjunction with aluminium oxide, CaF, ZnS, cryolite or graphite.

Titanium oxide is used especially if the damping medium is to be lightened considerably and should not affect rubber parts. The titanium dioxide should preferably be at least 99% pure.

The paste-like damping media according to the invention have a viscosity of about 100000 to $4 \times 10^6$ mPa s, in particular of about 150000 to $3 \times 10^6$ mPa s at 18° C.

According to a development of the invention the solid materials can also be surface-treated. Some of the solids employed are preferably used, for example, in silanized form.

The light-coloured solids can be replaced in part by natural or electrographite, the particle size of preferably 80% of which is less than 10 μm, in particular less than 5 μm. The light-coloured solids can be replaced up to 98%, particularly 60% by graphite. Graphite is used as solid additive especially if the damping medium is required to exhibit good thermal conductivity.

The wetting agents, or agents for reducing the surface tension, are added in quantities of, in particular, 0.5–2% by weight, based on the total weight of the damping medium. Use is made in particular of the amino salts of oleic acid, linoleic acid, palmitic acid and/or stearic acid. Organic compounds containing perfluoroalkyl groups are particularly effective wetting agents, for example fluoridated alkylpolyoxyethylene ethanol. Further suitable wetting agents are tallow fatty acid diamine, coconut fatty acid diamine, naphthalene sulfonate, alkyl aryl sulfonate, especially alkyl benzene sulfonate, fatty alcohol polyglycol ether and ethoxylated acetylene alcohols potassium fluoroalkyl carboxylate, alkyl ammonium iodide and fluorinated alkylpolyoxy ethylene ethanol.

It is advantageous to add to the damping medium according to the invention agents which stabilize the intrinsic viscosity, namely 1 to 7, in particular 2 to 4% by weight, based on the total weight of the damping medium, of Al- and/or Mg silicate and/or silicon dioxide in finely divided form. Microdispersed silicic acid, asbestos and Ca- and Na- bentonites are especially suitable. Bentonite is preferably worked in the presence of an activator such as propylene carbonate, acetone or acetonitrile. The viscosity stabilizers have a grain size of less than 0.5 $\mu$m, more especially 0.1 $\mu$m.

In order to stabilize the liquid phase against oxidation at increased temperatures, the damping medium according to the invention preferably contains 0.5 to 3% by weight, based on the total weight of the damping medium, of an antioxidant. Suitable antioxidants are, for example, phenol and thiophenol compounds of the type described in Ullmann's Enzyklopädie, Vol. 15, pages 217 to 220. Sterically hindered amino and phenol derivatives, for example the diphenyl amine, phenyl-$\alpha$-naphthyl amine, thiophenyl amine, alkyl phenols, di-tertiary butyl-p-cresol or trimethyl dihetero-chinoleine are especially suitable.

When using carboxylic acid esters and/or mineral oils as liquid phase it is advantageous to employ a polymeric viscosity improver and thus to adjust the viscosity of the liquid, since the carboxylic acid esters and mineral oils are not available in all desired viscosity ranges. The viscosity improvers are polymers which are soluble, partly soluble or at least disperse very well in the saturated aliphatic or aromatic carboxylic acid esters or in the mineral oils being used. Suitable viscosity improvers for the damping media according to the invention are e.g. polyisobutylenes, polymethacrylates, polybutadienes, polybutenes, polypropylenes, polyethylenes and/or polystyrols.

The aforementioned viscosity improvers are preferably added in a quantity of 0.5 to 5, in particular 0.5 to 2% by weight, based on the total weight of the damping medium.

When using polyglycols or silicone oils as liquid phse, it is generally not necessary to employ a viscosity improver because these compounds are available over the corresponding viscosity ranges. However, this does not exclude the possibility of employing additional viscosity improvers in special cases. Here too the viscosity improvers are added in a quantity of about 0.5 to 5% by weight, in particular 0.5 to 2% by weight, based on the total weight of the damping medium.

The damping media according to the invention are prepared by starting with the liquid phase and first mixing it with the wetting agent and the antioxidant. Then, at a temperature between 40° and 100° C., preferably 60° and 80° C., the agent for stabilizing the intrinsic viscosity is stirred in, stirring being continued until the amorphous silicon dioxide or finely divided aluminium silicate are homogeneously distributed and perhaps very slightly swollen. Following this, the light-coloured solids or mixture of light-coloured solids and graphite are added little by little at a constant rate. While mixing in the solid additives the temperature is preferably kept between 60° and 80° C. If the solid additives are not sufficiently finely divided, stirring or mixing can be performed with simultaneous grinding. Mixing and/or grinding of the damping medium is preferably carried out under vacuum so as to avoid air being stirred into the damping medium. Suitable stirring devices include for example dispersing machines and kneading machines such as double-action kneading machines, three-roller mills and planetary mixers. Mixing takes 20 to 120 minutes, depending on the mixing efficiency of the stirrer. A homogeneous, storage-stable paste is obtained. Even when stored for several months, there is no sedimentation of solid component(s).

The damping media according to the invention are suitable for hydraulically-operating damping devices, especially as media for engine bearings, wheel dampers, impact absorbers, steering dampers, shock absorbers, devices for rail vehicles and aeroplanes, vibration absorbers of all kinds, seat dampers and for vibration-free bedding of machines.

The invention concerns a medium for damping mechanical and/or acoustic vibrations, based on a liquid phase of silicone oil, polyglycol, mineral oil and/or a thermally-stable saturated aliphatic or aromatic carboxylic acid ester, a wetting agent and an agent for stabilizing the intrinsic viscosity, approximately 20 to approximately 80% by weight of at least one solid, 80% of which has a particle size of <20 $\mu$m, selected from the group comprising aluminium oxide, hydroxide, carbonate, triphosphate, silicate; cryolite; barium sulfate; calcium carbonate, hydroxide, triphosphate, fluoride; magnesium oxide, carbonate, silicate, aluminium silicate, stearate; lithium stearate; molybdenum sulfide; silicon dioxide; sillimanite; titanium dioxide; zinc sulfite; zinc pyrophosphate and polytetrafluoroethylene, approximately 0.1 to 4% by weight of a wetting agent, approximately 0.5 to 10% by weight of finely-divided Mg- and/or Al silicates and/or silicic acids as stabilizers of the intrinsic viscosity and approximately 0.1 to 5% by weight of an antioxidant, the % weight being based in each case on the total weight of the damping medium.

The invention concerns a medium for damping mechanical and/or acoustic vibrations, based on a liquid phase of silicone oil, polyglycol, mineral oil and/or a thermally-stable saturated aliphatic or aromatic carboxylic acid ester, a wetting agent and an agent for stabilizing the intrinsic viscosity, which contains approximately 20 to approximately 80% by weight of a mixture of at least one solid, 80% of which has a particle size of <20 $\mu$m, selected from the group comprising aluminium oxide, hydroxide, carbonate, triphosphate, silicate; cryolite; barium sulfate; calcium carbonate, hydroxide, triphosphate, fluoride; magnesium oxide, carbonate, silicate, aluminium silicate, stearate; lithium stearate; molybdenum sulfide; silicon dioxide; sillimanite; titanium dioxide; zinc sulfide; zinc pyrophosphate and polytetrafluor ethylene, and graphite, 80% of which has a particle size of <20 $\mu$m, approximately 0.1 to 4% by weight of a wetting agent, approximately 0.5 to 10% by weight of finely-divided Mg- and/or Al silicates and/or silicic acids as stabilizers of the intrinsic viscosity and approximately 0.1 to 5% by weight of an antioxidant, the % weight being based in each case on the total weight of the damping medium.

The invention is described in more detail by means of the following examples:

EXAMPLE 1

A homogeneous damping medium was prepared by mixing the carboxylic acid ester with the wetting agent and the antioxidant. The intrinsic viscosity stabilizer was then added at 60° and after stirring for some 20 minutes the solid additives were mixed in. The composition of the damping medium is summarized in the following Table:

| | Wt. % |
|---|---|
| Trimethyl propane adipic acid octyldecyl ester | 21 |
| Powdered talc | 75 |
| Tallow fatty acid diamine dioleate (wetting agent) | 1 |
| Amorphous silicon dioxide (particle size <1 μm) | 2 |
| Di-tert. butyl-p-cresol (antioxidant) | 1 |

In a further test the above ester was replaced by trimethyl adipic acid didecyl ester. In the "Sieb" Test (sieve test) (DIN 51817=German Industrial Standard 51817), both damping media showed an oil separation of less than 1% after 24 hours at 100° C.

EXAMPLE 2

A damping medium was prepared according to the method of Example 1, with the following composition:

| | Wt. % |
|---|---|
| Trioctyl trimellitate | 25 |
| Powdered talc | 60 |
| Graphite (particle size <0.8 μm) | 8 |
| Molybdenum sulfide | 2 |
| 1,3-propylene diamine dioleate (wetting agent) | 1 |
| Bentonite (Bentone) | 2 |
| Di-tert. butyl-p-cresol (antioxidant) | 1 |
| Polymethacrylate (viscosity improver) | 1 |

EXAMPLE 3

A damping medium was prepared according to the method of Example 1, with the following composition:

| | Wt. % |
|---|---|
| Trimethyl propane adipic acid octyldecyl ester | 50 |
| Graphite (particle size <0.8 μm) | 16 |
| Zinc sulfide | 30 |
| Fluorinated alkyl polyoxyethylene ethanol | 1 |
| Amorphous silicon dioxide (particle size <0.1 μm) | 2 |
| Diphenyl amine (antioxidant) | 1 |

EXAMPLE 4

A damping medium was prepared according to the method of Example 1, with the following composition:

| | Wt. % |
|---|---|
| Polyalkylene glycol ether | 44 |
| Aluminium hydroxide | 45 |
| Graphite (particle size <1 μm) | 7 |
| Fluorinated alkyl polyoxyethylene ethanol | 1 |
| Bentonite | 2 |
| Diphenylamine | 1 |

EXAMPLE 5

A damping medium was prepared according to the method of Example 1, with the following composition:

| | Wt. % |
|---|---|
| Polyglycol monobutyl ether (viscosity 80 mm$^2$/s at 50° C.) | 50 |
| Graphite (particle size <3 μm) | 14 |
| ZnS | 32.5 |
| Alkyl polyoxyethylene ethanol (fluorinated) (wetting agent) | 0.5 |
| Phenyl-α-naphthylamine (antioxidant) | 1 |
| Bentonite* with propylene carbonate as activator) | 2 |

*Propylene carbonate content: 0.5% by weight

EXAMPLE 6

A damping medium was prepared according to the method of Example 1, with the following composition:

| | Wt. % |
|---|---|
| Polyglycol monobutyl ether (viscosity 80 mm$^2$/s at 50° C. | 50 |
| Graphite (particle size 3 μm) | 41.8 |
| Tetrafluor ethylene (particle size 5 μm) | 4.7 |
| Fluorinated alkyl alkoxylate (wetting agent) | 0.5 |
| Bentonite* with propylene carbonate as activator | 2 |
| Trimethyl dihetero-chinoleine (antioxidant) | 1 |

*Propylene carbonate content: 0.5% by weight

EXAMPLE 7

A damping medium was prepared according to the method of Example 1, with the following composition:

| | Wt. % |
|---|---|
| Didecyl azelate | 43.7 |
| Powdered talc | 50 |
| Bentonite (Bentone) with 20% propylene carbonate as activator | 2.5 |
| Fluorinated alkyl polyoxyethylene ethanol (wetting agent) | 0.3 |
| Di.-tert. butyl-p-cresol (antioxidant) | 0.5 |
| Polymethacrylate (viscosity improver) | 3 |

Example 7 was repeated with ZnS instead of talc. Here too a homogeneous, permanently storage-stable paste was obtained, which does not separate even under compressive strength. The oil-separation (Sieb.test) is 0%.

EXAMPLE 8

A damping medium according to the invention was prepared was prepared as in Example 1, with the following composition:

| | Wt. % |
|---|---|
| Didecyl azelate | 32.8 |

-continued

| | Wt. % |
|---|---|
| Zinc sulfide (solid) grain size <2 μm | 46 |
| Graphite (particle size <3 μm) | 16.7 |
| Alkyl polyoxyethylene ethanol | 0.3 |
| Di.-tert. butyl-p-cresol | 0.4 |
| Bentonite (Bentone) with 20% propylene carbonate as activator | 1.8 |
| Polymethylacrylate (viscosity improver) | 2 |

PRACTICE-RELATED EXAMPLE

The damping medium according to the invention and described in Example 8 was filled into a hydraulically-operating impact damper comprising two concentric pipes, the inner of which formed the piston and the outer the cylinder. The inner pipe is filled with nitrogen, which is separated by a cross piston from the piston bottom behind. There is a hole in the bottom of the piston. The damping medium is in the cylinder space behind the piston bottom and is forced through the hole in the inner pipe when the latter is pushed on impact into the outer pipe. On entering the inner pipe, the damping medium pushes the cross piston back and compresses the nitrogen. The elastic power of the gas causes the two pipes to reassume their starting positions after the impact has ended. Projecting into the hole in the bottom of the piston there is a control pin. This control pin is of conical shape, the cone being produced in steps of about 1/10 mm. The further the pin penetrates into the hole, the smaller is the gap through which the damping medium can flow. In this way it is possible to obtain a power increase towards the end of the damping stroke.

Due to the viscosity of the damping medium according to the invention it is possible to have larger tolerances in the damping device than is the case in conventional series dampers with hydraulic oil. The damping medium does not foam at high pressure differences and has a flashpoint of more than 300° C.

The impact damper was fixed to the front of a motor vehicle weighing 475 kg.

Figure 2:
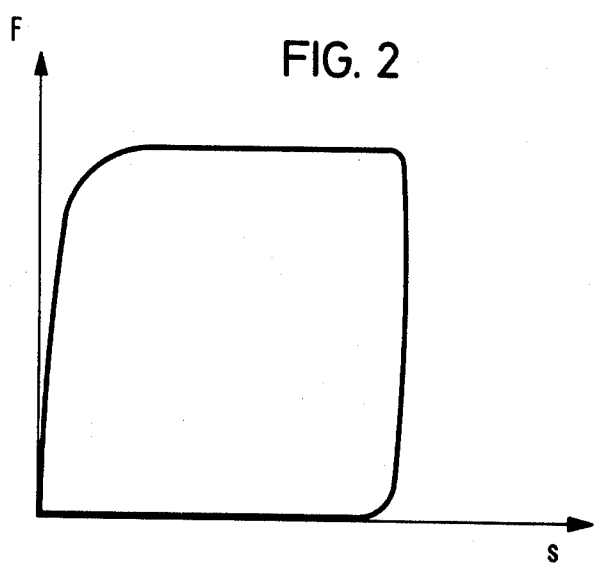

In order to determine the length of the compression stroke an inductive distance sensor was attached firmly to the vehicle and connected with the tip of the impact damper. An acceleration sensor was also attached to the vehicle in order to determine the vehicle retardation. Several impact tests were carried out, under the following test conditions:

Vehicle weight 450 kg; impact speed 5.3 km/h
Vehicle weight 475 kg; impact speed 7.9 km/h The force-distance diagram for the above impact tests is almost rectangular, indicating optimal damping properties. The entire kinetic energy of the vehicle is taken up by the damper and the available damping distance (stroke) optimally used (see FIGS. 1 and 2). FIG. 1 shows the force-distance diagram for the impact test with a load of 450 kg at 5.3 km/h while FIG. 2 shows the impact test with a load of 475 kg at 7.9 km/h.

Even at impact speeds of up to 10 km/h the damper is fully effective. The vehicle retardation (vehicle weight 500 kg) is 9.8 g and thus well under the retardation values for standard impact dampers filled with hydraulic oils. Considerably more energy is taken up by the impact damper filled with the damping medium of the invention than in the case of standard impact dampers.

While standard dampers filled with hydraulic oil only convert part of the impact energy and store the remainder like a spring that subsequently decelerates the vehicle, impact dampers filled with the damping medium according to the invention dissipate practically all the kinetic energy resulting from the impact. The vehicle is not decelerated.

We claim:

1. A paste-like damping medium for damping mechanical and/or acoustic vibrations, based on a liquid phase of silicone oil, polyglycol, mineral oil and/or a thermally-stable saturated aliphatic or aromatic carboxylic acid ester, a wetting agent and an agent for stabilizing the intrinsic viscosity, characterized in that it contains approximately 20 to approximately 80% by weight of at least one solid, 80% of which has a particle size of <20 μm, selected from the group comprising aluminum oxide, aluminum hydroxide, aluminum carbonate, aluminum triphosphate, aluminum silicate, cryolite, barium sulfate, calcium carbonate, calcium hydroxide, calcium triphosphate, calcium fluoride, magnesium oxide, magnesium carbonate, magnesium silicate, magnesium-aluminium silicate, magnesium stearate, lithium stearate, molybdenum sulfide, silicon dioxide, sillimanite, titanium dioxide, zinc sulfide, zinc pyrophosphate and polytetrafluoroethylene, approximately 0.1 to 4% by weight of a wetting agent, approximately 0.5 to 10% by weight of a finely-divided stabilizer of the intrinsic viscosity of at least one member separately selected from the group consisting of magnesium silicate, magnesium-aluminum silicate, aluminum silicate and silicic acids, and approximately 0.1 to 5% by weight of an antioxidant, the % weight being based in each case on the total weight of the damping medium.

2. A paste-like damping medium for damping mechanical and/or acoustic vibrations, based on a liquid phase of silicone oil, polyglycol, mineral oil and/or a thermally-stable saturated aliphatic or aromatic carboxylic acid ester, a wetting agent and an agent for stabilizing the intrinsic viscosity, characterized in that it contains approximately 20 to approximately 80% by weight of a mixture of at least one solid, 80% of which has a particle size of <20 μm, selected from the group comprising aluminum oxide, aluminum hydroxide, aluminum carbonate, aluminum triphosphate, aluminum silicate, cryolite, barium sulfate, calcium carbonate, calcium hydroxide, calcium triphosphate, calcium fluoride, magnesium oxide, magnesium carbonate, magnesium silicate, magnesium-aluminum silicate, magnesium stearate, lithium stearate, molybdenum sulfide, silicon dioxide, sillimanite, titanium dioxide, zinc sulfide, zinc pyrophosphate and polytetrafluoroethylene, and graphite 80% of which has a particle size of <20 μm, approximately 0.1 to 4% by weight of a wetting agent, approximately 0.5 to 10% by weight of a finely-divided stabilizer of the intrinsic viscosity of at least one member separately selected from the group consisting of magnesium silicate, magnesium-aluminum silicate, aluminum silicate and silicic acids, and approximately 0.1 to 5% by weight of an antioxidant, the % weight being based in each case on the total weight of the damping medium.

3. Damping medium according to claim 1 or claim 2, characterized in that the solid or mixture of solids makes up 30 to 70% by weight of the damping medium, based on the total weight of the damping medium.

4. Damping medium according to claim 1, characterized in that the solids are surface-treated, in particular silanized.

5. Damping medium according to claim 3, characterized in that the solid is powdered talc and/or kaolin.

6. Damping medium according to claim 1 or claim 2, characterized in that the particle size of 80% of the solids is <10 μm.

7. Damping medium according to one of claims 1 or 2, chracterized in that the particle size of 80% of the solids is <5 μm.

8. Damping medium according to claim 2, characterized in that the mixture contains at the most 98% by weight of graphite.

9. Damping medium according to claim 8, characterized in that the mixture contains at the most 60% by weight of graphite.

10. Damping medium according to claim 1 or claim 2, characterized in that it contains 0.5 to 2% by weight of wetting agent for reducing the surface tension.

11. Damping medium according to claim 1 or claim 10, characterized in that the wetting agent is an amino salt of oleic acid, linoleic acid, palmitic acid and/or stearic acid, tallow fatty acid diamine, coconut fatty acid diamine, naphthaline sulfonate, alkyl aryl sulfonate, fatty alcohol polyglycol ether, ethoxylated acetylene alcohols, alkyl compounds containing perfluoroalkyl groups, fluorinated alkylpolyoxyethylene ethanol, potassium fluoroalkyl carboxylate and/or fluorinated alkyl ammonium iodide.

12. Damping medium according to claim 1 or claim 2, characterized in that it contains 1 to 7% by weight of intrinsic viscosity stabilizer, based on the total weight of the damping medium.

13. Damping medium according to claim 1 or claim 2, characterized in that it contains 2 to 4% by weight of intrinsic viscosity stabilizer, based on the total weight of the damping medium.

14. Damping medium according to claim 1 or claim 2, characterized in that it contains 0.5 to 3% by weight, based on the total weight of the damping medium, of antioxidants for the liquid phase components.

15. Damping medium according to claim 14, characterized in that the antioxidants are sterically-hindered alkyl phenols, thiophenols or dialkyl selenides, more especially diphenyl amine, phenyl-α-naphthyl amine, methylene-4,4'-bis-(2,6-di-tertiary butyl phenol), thiophenyl amine, di-tertiary butyl-p-cresol or trimethyl dihetero-chinoleine.

16. Damping medium according to claim 1 or claim 2, characterized in that it contains 0.5 to 5% by weight, based on tht total weight of the damping medium, of a polymeric viscosity improver as additional additive.

17. Damping medium according to claim 16, characterized in that the viscosity improver is a polyisobutylene, polymethacrylate, polybutene, polybutadiene, polyethylene, polypropylene and/or polystyrol.

18. Damping medium according to claim 1 or claim 2, characterized in that the intrinsic viscosity stabilizer is a Ca bentonite, Na bentonite, asbestos and/or finely-dispersed silicic acid.

19. Damping medium according to claim 1 or claim 2, characterized in that it is used in impact dampers, wheel dampers, steering dampers, seat dampers, engine dampers, machine bed dampers, industrial shock absorbers or industrial vibration dampers.

20. Method for manufacturing the damping medium according to claim 1 or claim 2, characterized in that the liquid phase is mixed at a temperature between 40° C. and 100° C., more especially 60° C. and 80° C., with the wetting agent and the antioxidant, the intrinsic viscosity stabilizer added and allowed to swell and then the remaining solids mixed in in small quantities, until a homogeneous paste is obtained.

* * * * *